(12) United States Patent
Isobe et al.

(10) Patent No.: US 12,199,546 B2
(45) Date of Patent: Jan. 14, 2025

(54) MOTOR CONTROL DEVICE AND MOTOR CONTROL METHOD

(71) Applicant: Hitachi Astemo, Ltd., Hitachinaka (JP)

(72) Inventors: Junki Isobe, Hitachinaka (JP); Kohei Myoen, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 116 days.

(21) Appl. No.: 18/012,401

(22) PCT Filed: Jun. 10, 2021

(86) PCT No.: PCT/JP2021/022117
§ 371 (c)(1),
(2) Date: Dec. 22, 2022

(87) PCT Pub. No.: WO2022/009599
PCT Pub. Date: Jan. 13, 2022

(65) Prior Publication Data
US 2023/0336098 A1    Oct. 19, 2023

(30) Foreign Application Priority Data
Jul. 8, 2020   (JP) ................. 2020-117478

(51) Int. Cl.
    H02P 6/16     (2016.01)
    H02P 21/22    (2016.01)
    H02P 29/60    (2016.01)
(52) U.S. Cl.
    CPC ........... *H02P 6/16* (2013.01); *H02P 21/22* (2016.02); *H02P 29/60* (2016.02); *H02P 2207/05* (2013.01)
(58) Field of Classification Search
    CPC ......... H02P 6/16; H02P 21/22; H02P 2207/05
    See application file for complete search history.

(56) References Cited

U.S. PATENT DOCUMENTS

| 2012/0249025 A1* | 10/2012 | Okita | H02P 21/34 |
| | | | 318/400.02 |
| 2014/0062362 A1* | 3/2014 | Kawai | H02P 29/662 |
| | | | 318/400.22 |

(Continued)

FOREIGN PATENT DOCUMENTS

| JP | 2008-115751 A | 5/2008 |
| JP | 2013-21843 A | 1/2013 |

(Continued)

OTHER PUBLICATIONS

International Search Report, PCT/JP2021/022117, dated Aug. 3, 2021. 2 pages.

*Primary Examiner* — Bickey Dhakal
(74) *Attorney, Agent, or Firm* — Volpe Koenig

(57) ABSTRACT

A motor control device controls a motor, which is driven by three-phase alternating currents and to which a magnetic pole position sensor measuring a magnetic pole position of a rotor is attached, using a detection value of a rotation angle of the motor based on a measurement result of the magnetic pole position by the magnetic pole position sensor, compares a peak-current-time rotation angle representing the detection value of the rotation angle at a peak of a current value of a target phase and a reference rotation angle representing the rotation angle at a peak of a predetermined current waveform of the target phase using any one phase of the three-phase alternating currents during a three-phase short circuit of the motor as the target phase, and corrects the detection value of the rotation angle based on a result of the comparison.

9 Claims, 7 Drawing Sheets

(56) References Cited

U.S. PATENT DOCUMENTS

2014/0070745 A1\* 3/2014 Hirono ................. H02P 25/024
318/400.32
2021/0067069 A1 3/2021 Iezawa et al.

FOREIGN PATENT DOCUMENTS

JP 2017-212783 A 11/2017
WO 2019/207754 A1 10/2019

\* cited by examiner

MOTOR CONTROL DEVICE AND MOTOR CONTROL METHOD

TECHNICAL FIELD

The present invention relates to a motor control device and a motor control method.

BACKGROUND ART

A magnetic pole position sensor that measures a magnetic pole position of a rotor has been widely used in order to control a three-phase AC motor. When an attachment position of the magnetic pole position sensor is displaced from an original position, an error may be generated in a rotation angle of the motor obtained from a measurement result of the magnetic pole position by the magnetic pole position sensor, which is likely to cause a decrease in power consumption efficiency of the motor, an acceleration failure, or the like. Therefore, in general, an angle offset corresponding to the displacement of the attachment position of the magnetic pole position sensor is obtained in advance to correct the error in the rotation angle using the angle offset.

As a method of correcting a rotation angle using an angle offset, a technique in the following PTL 1 is known. PTL 1 discloses a motor control device that calculates a phase current in a case where a phase error is not generated in a rotation angle of a motor as a phase current theoretical value, calculates a phase error correction value based on a difference between the phase current theoretical value and a phase current detected by a phase current detection unit in a state where an end of the motor is short-circuited, and performs phase correction on the rotation angle using the phase error correction value.

CITATION LIST

Patent Literature

PTL 1: JP 2017-212783 A

SUMMARY OF INVENTION

Technical Problem

In general, a phase current flowing through a three-phase AC motor is detected using a current sensor, and a detection value thereof includes an error (offset error or gain error) due to characteristics of the current sensor. In the motor control device of PTL 1, the accuracy of the phase error correction value decreases due to an influence of such a detection error of the phase current. Therefore, there is room for improvement in terms of the calculation accuracy of the rotation angle of the three-phase AC motor.

Solution to Problem

A motor control device according to the present invention controls a motor, which is driven by three-phase alternating currents and to which a magnetic pole position sensor measuring a magnetic pole position of a rotor is attached, using a detection value of a rotation angle of the motor based on a measurement result of the magnetic pole position by the magnetic pole position sensor, compares a peak-current-time rotation angle representing the detection value of the rotation angle at a peak of a current value of a target phase and a reference rotation angle representing the rotation angle at a peak of a predetermined current waveform of the target phase using any one phase of the three-phase alternating currents during a three-phase short circuit of the motor as the target phase, and corrects the detection value of the rotation angle based on a result of the comparison.

A motor control method according to the present invention is a method of controlling a motor, which is driven by three-phase alternating currents and to which a magnetic pole position sensor measuring a rotation angle of a rotor is attached, using a detection value of a rotation angle of the motor based on a measurement result of the magnetic pole position by the magnetic pole position sensor, the method including: comparing a peak-current-time rotation angle representing the detection value of the rotation angle at a peak of a current value of a target phase and a reference rotation angle representing the rotation angle at a peak of a predetermined current waveform using any one phase of the three-phase alternating currents during a three-phase short circuit of the motor as the target phase; correcting the detection value of the rotation angle based on a result of the comparison between the peak-current-time rotation angle and the reference rotation angle; and controlling the motor using a corrected detection value of the rotation angle.

Advantageous Effects of Invention

According to the present invention, the rotation angle of the three-phase AC motor can be accurately obtained.

BRIEF DESCRIPTION OF DRAWINGS

FIG. 7 is a view for describing a specific example of a method of setting a reference rotation angle βspd.

DESCRIPTION OF EMBODIMENT S

First Embodiment

Hereinafter, a first embodiment of the present invention will be described with reference to the drawings.

Figure 1:
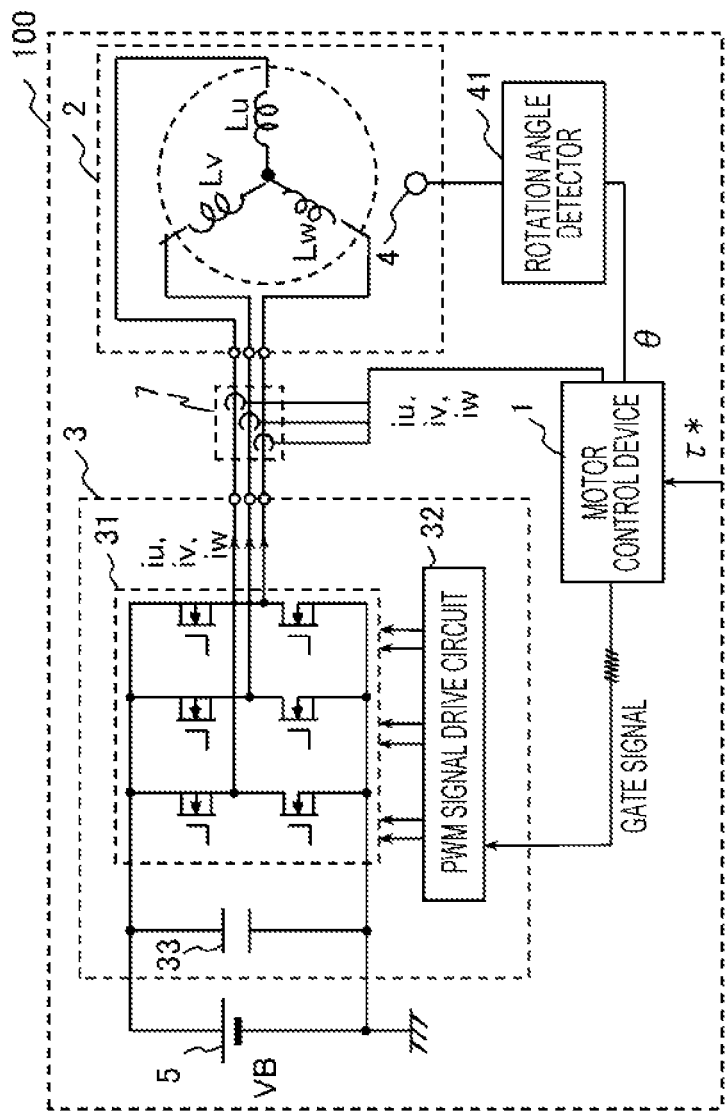
FIG. 1 is an overall configuration diagram of a motor drive system including a motor control device according to an embodiment of the present invention.

FIG. 1 is an overall configuration diagram of a motor drive system including a motor control device according to an embodiment of the present invention. In FIG. 1, a motor drive system 100 includes a motor control device 1, a motor 2, an inverter 3, a rotation angle detector 41, and a high-voltage battery 5.

The motor control device 1 generates a gate signal for controlling driving of the motor 2 based on a torque command τ* according to a target torque requested from a vehicle to the motor 2, and outputs the gate signal to the inverter 3. Note that details of the motor control device 1 will be described later.

The inverter 3 includes an inverter circuit 31, a PWM signal drive circuit 32, and a smoothing capacitor 33. The PWM signal drive circuit 32 generates a PWM signal for controlling each of switching elements included in the inverter circuit 31 based on the gate signal input from the motor control device 1, and outputs the PWM signal to the inverter circuit 31. The inverter circuit 31 includes the switching elements respectively corresponding to an upper arm and a lower arm of a U phase, a V phase, and a W phase. As each of these switching elements is controlled according to the PWM signal input from the PWM signal drive circuit 32, DC power supplied from the high-voltage battery 5 is converted into AC power and output to the motor 2. The smoothing capacitor 33 smooths the DC power supplied from the high-voltage battery 5 to the inverter circuit 31.

The motor 2 is a three-phase AC synchronous motor rotationally driven by three-phase alternating currents output from the inverter 3, and includes a stator and a rotor. When the AC power input from the inverter 3 is applied to three-phase coils Lu, Lv, and Lw provided in the stator, three-phase alternating currents iu, iv, and iw flow through the motor 2, and magnetic fluxes corresponding to the three-phase alternating currents iii, iv, and iw are generated in the coils, respectively. As an attractive force and a repulsive force are generated between the magnetic flux of each of the coils and a magnetic flux of a permanent magnet arranged in the rotor, a torque is generated in the rotor, and the rotor is rotationally driven.

A magnetic pole position sensor 4 that measures a magnetic pole position of the rotor is attached to the motor 2. The rotation angle detector 41 calculates a rotation angle θ of the motor 2 according to the magnetic pole position from an input signal of the magnetic pole position sensor 4 to detect the rotation angle G. A value of the rotation angle θ detected by the rotation angle detector 41 is input to the motor control device 1, and is used in phase control of AC power performed by the motor control device 1 generating a gate signal in accordance with a phase of an induced voltage of the motor 2.

Here, a resolver including an iron core and a winding is more suitable as the magnetic pole position sensor 4, but there is no problem even if a sensor using a magnetoresistive element such as a GMR sensor or a Hall element is used. Any sensor can be used as the magnetic pole position sensor 4 as long as the magnetic pole position of the rotor can be measured.

Current sensors 7 are arranged between the inverter 3 and the motor 2. The current sensors 7 detect the three-phase alternating currents iu, iv, and iw (U-phase alternating current iu, V-phase alternating current iv, and W-phase alternating current iw) for energizing and rotationally driving the motor 2. The current sensor 7 is configured using, for example, a Hall current sensor or the like. Results of the three-phase alternating currents iu, iv, and iw detected by the current sensors 7 are input to the motor control device 1, and are used for the generation of a gate signal performed by the motor control device 1. Note that FIG. 1 illustrates an example in which three current sensors 7 are installed corresponding to the U phase, the V phase, and the W phase, respectively, but two current sensors 7 may be provided, and the alternating current of the remaining one phase may be calculated from a fact that the sum of the three-phase alternating currents iu, iv, and iw is zero. In addition, a pulsed direct current flowing from the high-voltage battery 5 into the inverter 3 may be detected by a shunt resistor or the like inserted between the smoothing capacitor 33 and the inverter 3, and the three-phase alternating currents iu, iv, and iw may be obtained based on the direct current and three-phase AC voltages Vu, Vv, and Vw applied from the inverter 3 to the motor 2.

Figure 2:
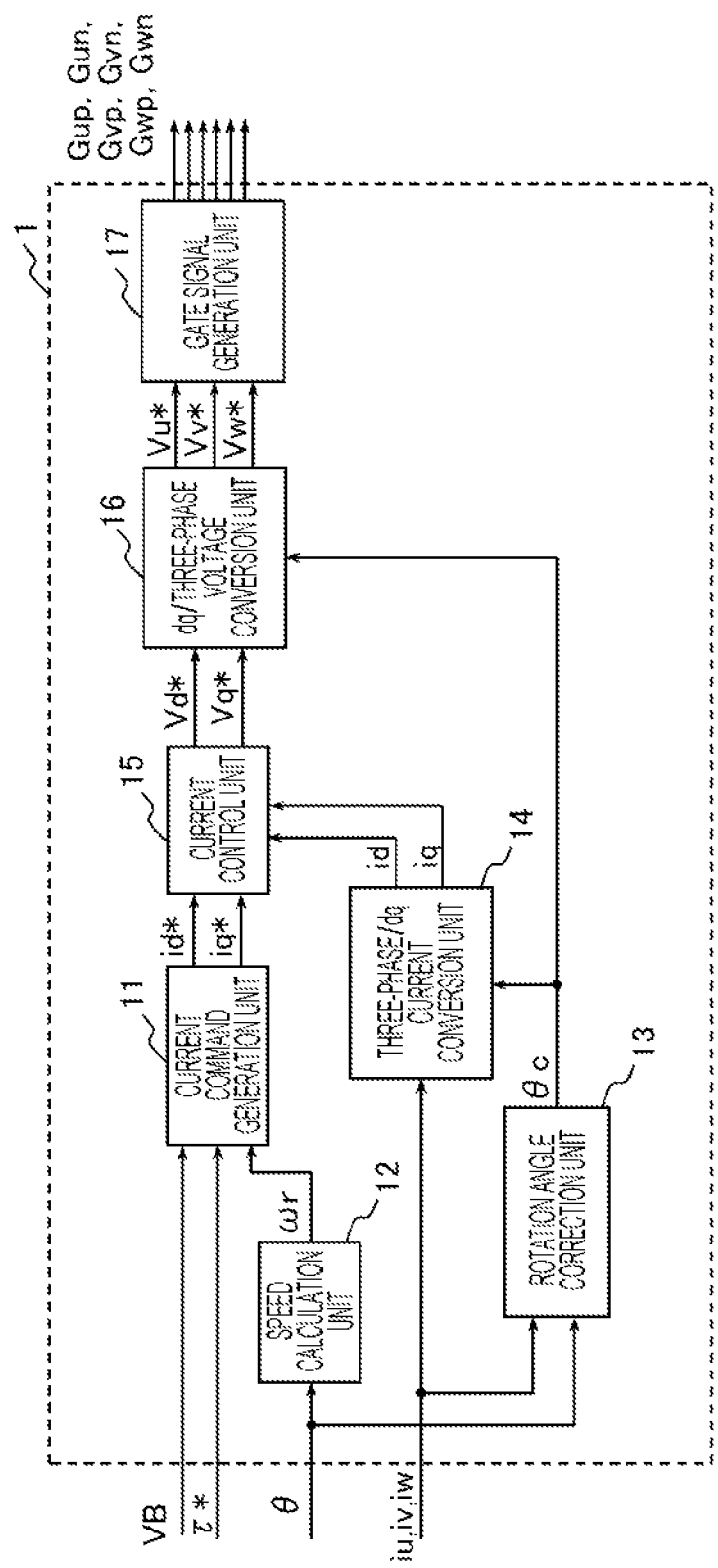
FIG. 2 is a block diagram illustrating a functional configuration of the motor control device according to the embodiment of the present invention.

Next, details of the motor control device 1 will be described. FIG. 2 is a block diagram illustrating a functional configuration of the motor control device 1 according to the embodiment of the present invention. In FIG. 2, the motor control device 1 includes functional blocks of a current command generation unit 11, a speed calculation unit 12, a rotation angle correction unit 13, a three-phase/dq current conversion unit 14, a current control unit 15, a dq/three-phase voltage conversion unit 16, and a gate signal generation unit 17. The motor control device 1 is configured using, for example, a microcomputer, and can implement these functional blocks by executing a predetermined program in the microcomputer. Alternatively, some or all of these functional blocks may be implemented using a hardware circuit such as a logic IC or an FPGA.

The current command generation unit 11 calculates a d-axis current command id* and a q-axis current command iq* based on the input torque command τ* and a power supply voltage VB of the high-voltage battery 5. Here, for example, the d-axis current command id* and the q-axis current command iq* according to the torque command τ* are obtained using a preset current command map, formula, or the like.

The speed calculation unit 12 calculates a motor rotation speed ωr representing the rotation speed (rotational speed) of the motor 2 from a temporal change of the rotation angle θ. Note that the motor rotation speed ωr may be a value represented by either an angular speed (rad/s) or the rotational speed (rpm). In addition, these values may be mutually converted and used.

The rotation angle correction unit 13 corrects a detection value of the rotation angle θ obtained by the rotation angle detector 41 based on the three-phase alternating currents iu, iv, and iw measured by the current sensors 7 when the motor 2 is in a three-phase short-circuit state, and outputs a corrected rotation angle θc. Note that details of a method of correcting the rotation angle θ by the rotation angle correction unit 13 will be described later.

The three-phase/dq current conversion unit 14 performs dq conversion based on the rotation angle θc corrected by the rotation angle correction unit 13 on the three-phase alternating currents iu, iv, and iw detected by the current sensors 7 to calculate a d-axis current value id and a q-axis current value iq.

The current control unit 15 calculates a d-axis voltage command Vd* and a q-axis voltage command Vq* according to the torque command τ* based on deviations between the d-axis current command id* and the q-axis current command iq* output from the current command generation unit 11 and the d-axis current value id and the q-axis current value iq output from the three-phase/dq current conversion unit 14 such that the former values coincide with the latter values, respectively. Here, the d-axis voltage command Vd* based on the deviation between the d-axis current command id* and the d-axis current value id and the q-axis voltage command Vq* based on the deviation between the q-axis current command iq* and the q-axis current value iq are obtained, for example, by a control method such as PI control.

The dq/three-phase voltage conversion unit 16 performs three-phase conversion based on the rotation angle θc corrected by the rotation angle correction unit 13 on the d-axis voltage command Vd* and the q-axis voltage command Vq* calculated by the current control unit 15 to calculate three-phase voltage commands Vu*, Vv*, and Vw* (U-phase voltage command value Vu*, V-phase voltage command value Vv*, and W-phase voltage command value Vw*). Thus, the three-phase voltage commands Vu*, Vv*, and Vw* according to the torque command τ* are generated.

The gate signal generation unit 17 performs pulse width modulation on each of the three-phase voltage commands Vu*, Vv*, and Vw* output from the dq/three-phase voltage conversion unit 16 to generate a gate signal for controlling the operation of the inverter 3. Specifically, pulse voltages are generated respectively for the U phase, the V phase, and the W phase based on a result of comparison between the three-phase voltage commands Vu*, Vv*, and Vw* output from the dq/three-phase voltage conversion unit 16 and a predetermined carrier signal. Then, gate signals for the switching elements of the respective phases of the inverter 3 are generated based on the generated pulsed voltages. At this time, upper arm gate signals Gup, Gvp, and Gwp of the respective phases are logically inverted to generate lower arm gate signals Gun, Gvn, and Gwn. The gate signals generated by the gate signal generation unit 17 are output from the motor control device 1 to the PWM signal drive circuit 32 of the inverter 3, and are converted into PWM signals by the PWM signal drive circuit 32. Thus, the respective switching elements of the inverter circuit 31 are controlled to be turned on/off, and an output voltage of the inverter 3 is adjusted.

Next, the operation of the rotation angle correction unit 13 in the motor control device 1 will be described. An attachment position of the magnetic pole position sensor 4, used by being attached to the motor 2, is sometimes displaced from the original position due to the work accuracy at the time of attachment, vibration generated during use of the motor 2, and the like. When the attachment position of the magnetic pole position sensor 4 is displaced, an error is generated in a measurement result of the magnetic pole position by the magnetic pole position sensor 4, and thus, a detection value of the rotation angle θ output from the rotation angle detector 41 includes an error. There is a possibility that such an error in the rotation angle θ causes a decrease in power consumption efficiency of the motor 2, an acceleration failure, or the like. Therefore, in the motor control device 1 of the present embodiment, the rotation angle correction unit 13 corrects the detection value of the rotation angle θ output from the rotation angle detector 41 during the driving of the motor 2 based on the three-phase alternating currents iu, iv, and iw measured by the current sensors 7 when the motor 2 is in the three-phase short-circuit state. Thus, the control of the motor 2 can be performed using the corrected rotation angle θc in which the error in the rotation angle θ due to the displacement of the attachment position of the magnetic pole position sensor 4 is suppressed.

Figure 3:
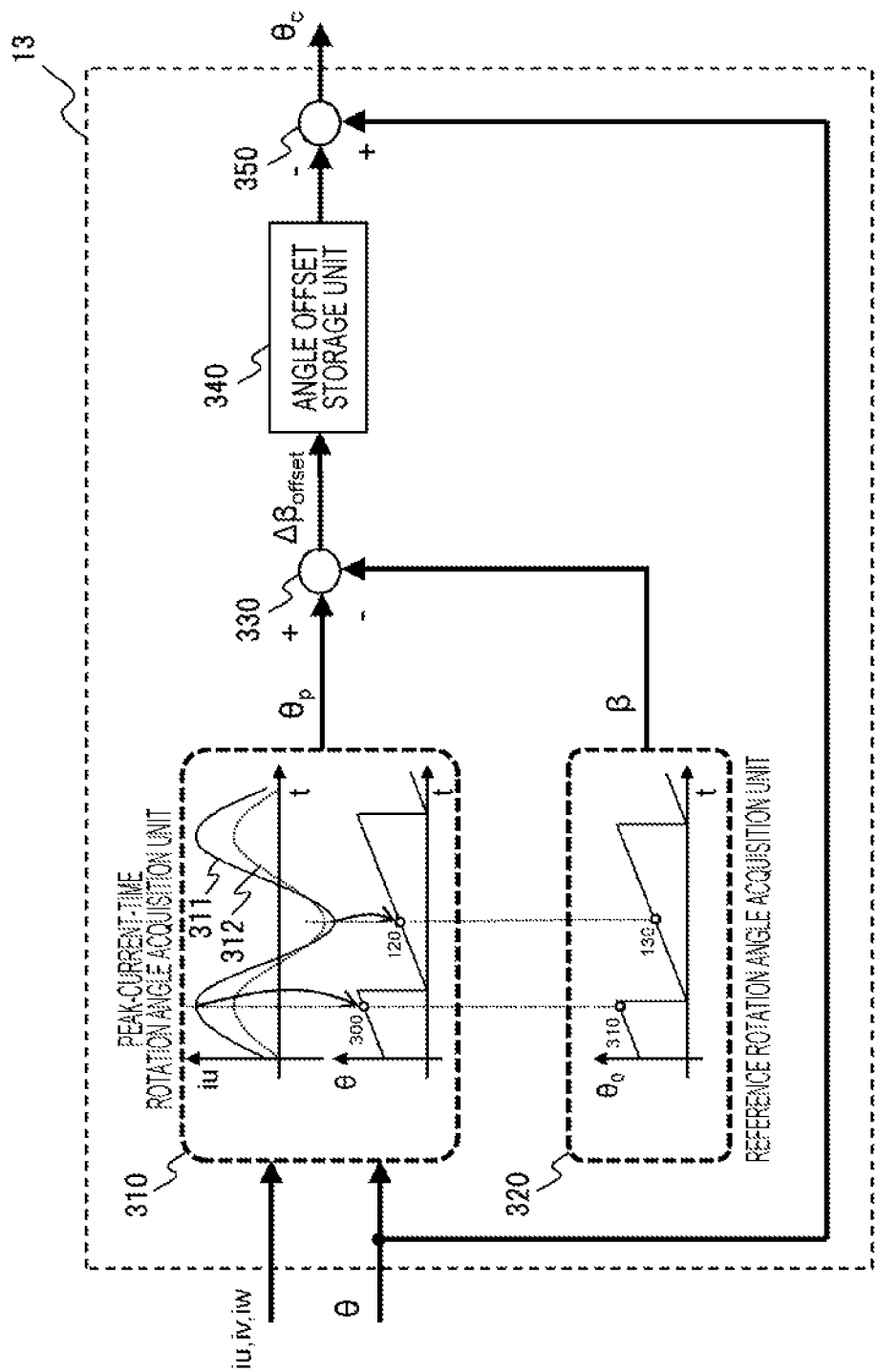
FIG. 3 is a block diagram of a rotation angle correction unit according to a first embodiment of the present invention.

FIG. 3 is a block diagram of the rotation angle correction unit 13 according to the first embodiment of the present invention. The rotation angle correction unit 13 includes functional blocks of a peak-current-time rotation angle acquisition unit 310, a reference rotation angle acquisition unit 320, a difference calculation unit 330, an angle offset storage unit 340, and a subtractor 350.

The peak-current-time rotation angle acquisition unit 310 acquires, as a peak-current-time rotation angle θp, a detection value of the rotation angle θ at a peak time of a current value of a target phase using any one phase of the three-phase alternating currents iu, iv, and iw measured by the current sensors 7 during the three-phase short circuit of the motor 2 as the target phase. Specifically, when the motor 2 is brought into the three-phase short-circuit state, for example, in a case where the U-phase alternating current iu is used as the target phase, the peak-current-time rotation angle acquisition unit 310 detects a timing at which the U-phase alternating current iu has a maximum peak or a minimum peak. Then, the peak-current-time rotation angle θp can be acquired by acquiring a detection value of the rotation angle θ output from the rotation angle detector 41 at this timing.

Note that, as is well known, the three-phase short-circuit state is a state in which the switching elements of all the three phases are turned on in one of the upper arm and the lower arm of the inverter 3, and the switching elements of all the three phases are turned off in the other. For example, in a case where the motor 2 is mounted on an electric vehicle or a hybrid vehicle and used as a motor for traveling of the vehicle, traveling energy of the vehicle rotates the rotor of the motor 2 when the inverter 3 is stopped, so that an induced voltage of the motor 2 increases. There is a possibility that the switching elements are destroyed if the induced voltage exceeds withstand voltages of the switching elements of the inverter 3. Therefore, the switching elements are protected by bringing the motor 2 into the three-phase short-circuit state to circulate the current in the motor 2.

The peak-current-time rotation angle acquisition unit 310 can detect the timing at which the U-phase alternating current iu has the maximum peak or the minimum peak, for example, by any one of the following two methods.

(First Method)

The peak-current-time rotation angle acquisition unit 310 acquires a measurement value of the U-phase alternating current iu output from the current sensor 7 at every predetermined sampling period. Then, a magnitude relationship between each acquired measurement value and a previous measurement value thereof is compared, and a measurement value obtained when the magnitude relationship has been inverted is acquired as the maximum current value or the minimum current value. Specifically, when the n-th measurement value of iu is denoted by iu_n and the previous (n−1)th measurement value of iu is denoted by iu_n−1, the measurement value iu_n obtained when the magnitude relationship therebetween has changed from iu_n−1<iu_n to iu_n−1>iu_n is acquired as a maximum current value iu_max. Alternatively, the measurement value iu_n when the magnitude relationship therebetween has changed from iu_n−1>iu_n to iu_n−1<iu_n is acquired as a minimum current value iu_min.

When the maximum current value iu_max or the minimum current value iu_min has been acquired by the above processing, the peak-current-time rotation angle acquisition unit 310 repeats this processing a plurality of times. Thus, a plurality of maximum current values iu_max or a plurality of minimum current values iu_min are acquired.

When the plurality of maximum current values iu_max or the plurality of minimum current values iu_min have been acquired, the peak-current-time rotation angle acquisition unit 310 obtains a median thereof. Thus, a median iu_max (med) of the maximum current values or a median iu_min (med) of the minimum current values is obtained.

The peak-current-time rotation angle acquisition unit 310 sets the median iu_max(med) of the maximum current values or the median iu_min(med) of the minimum current values obtained as described above as the maximum peak or the minimum peak of the U-phase alternating current iu.

Then, a detection value of the rotation angle θ when these current values are measured is acquired as a peak-current-time rotation angle θp.

(Second Method)

The peak-current-time rotation angle acquisition unit 310 acquires a measurement value of the U-phase alternating current iu output from the current sensor 7 at every predetermined sampling period. Then, a magnitude relationship between each acquired measurement value and a previous measurement value thereof is compared, and a measurement value obtained when the magnitude relationship has been inverted is acquired as the maximum current value or the minimum current value. Specifically, a maximum current value iu_max or a minimum current value iu_min is acquired using a technique similar to that of the first method described above.

When the maximum current value iu_max or the minimum current value iu_min has been acquired by the above processing, the peak-current-time rotation angle acquisition unit 310 acquires a detection value of the rotation angle θ obtained when these current values are measured. This processing is repeated a plurality of times to acquire a plurality of combinations of the maximum current value iu_max or the minimum current value iu_min and the detection value of the rotation angle θ.

When the plurality of combinations of the maximum current value iu_max or the minimum current value iu_min and the detection value of the rotation angle θ have been acquired, the peak-current-time rotation angle acquisition unit 310 estimates the rotation angle θ at a maximum peak time or a minimum peak time of the U-phase alternating current iu based on these combinations. For example, the least-squares method can be used to estimate the rotation angle θ. Specifically, each of the combinations is plotted on a two-dimensional graph with, for example, the maximum current value iu_max or the minimum current value iu_min on the vertical axis and the rotation angle θ on the horizontal axis, and the least-squares method is applied to the respective plotted points to obtain a straight line indicating a relationship between the maximum current value iu_max or the minimum current value iu_min and the rotation angle θ on the two-dimensional graph. Then, an average value of the maximum current values iu_max or the minimum current values iu_min is calculated, and the rotation angle θ corresponding to the average value is obtained on the straight, thereby estimating the rotation angle θ at the maximum peak time or the minimum peak time of the U-phase alternating current iu. The rotation angle θ thus estimated is acquired as the peak-current-time rotation angle θp.

Note that the peak-current-time rotation angle θp may be acquired by a method other than the first method and the second method described above. In addition, the peak-current-time rotation angle θp may be acquired using a phase other than the U-phase alternating current iu, that is, the V-phase alternating current iv or the W-phase alternating current iw as a target phase. The peak-current-time rotation angle θp can be acquired by any method as long as a detection value of the rotation angle θ at a peak of a current value of a target phase can be acquired as the peak-current-time rotation angle θp using any one phase of the three-phase alternating currents iu, iv, and iw measured by the current sensors 7 during the three-phase short circuit of the motor 2 as the target phase.

FIG. 3 illustrates an example in which the peak-current-time rotation angle acquisition unit 310 has acquired θp=300° as the peak-current-time rotation angle θp regarding the maximum peak of the U-phase alternating current iu and θp=120° as the peak-current-time rotation angle θp regarding the minimum peak thereof.

The reference rotation angle acquisition unit 320 acquires, as a reference rotation angle ß, the rotation angle θ at a peak of a predetermined current waveform of a target phase using any one phase, which is the same as that of the peak-current-time rotation angle acquisition unit 310 among the three-phase alternating currents iu, iv, and iw, as the target phase. Here, for example, in a case where the U-phase alternating current iu is used as the target phase, a relationship between the U-phase alternating current iu and a detection value of the rotation angle θ when the magnetic pole position sensor 4 is attached to the original position is acquired in advance by experiment, simulation, or the like. Based on this relationship, a detection value of the rotation angle θ at a timing when the U-phase alternating current iu reaches a maximum peak or a minimum peak is acquired in advance and stored in the reference rotation angle acquisition unit 320. Thus, the reference rotation angle ß can be acquired by the reference rotation angle acquisition unit 320.

Note that the reference rotation angle ß may be acquired by a method other than the method described above. In addition, when a phase other than the U-phase alternating current iu, that is, the V-phase alternating current iv or the W-phase alternating current iw is used as a target phase, the reference rotation angle acquisition unit 320 may acquire the reference rotation angle ß with respect to these target phases. The reference rotation angle ß can be acquired by any method as long as the rotation angle θ at the peak of the current waveform of the target phase when the magnetic pole position sensor 4 is attached to the original position can be acquired as the reference rotation angle @.

FIG. 3 illustrates an example in which the reference rotation angle acquisition unit 320 has acquired ß=310° as the reference rotation angle ß regarding the maximum peak of the U-phase alternating current iu and ß=130° as the reference rotation angle ß regarding the minimum peak thereof.

The difference calculation unit 330 calculates a difference between the peak-current-time rotation angle θp acquired by the peak-current-time rotation angle acquisition unit 310 and the reference rotation angle ß acquired by the reference rotation angle acquisition unit 320.

The angle offset storage unit 340 stores the difference between the peak-current-time rotation angle θp and the reference rotation angle ß calculated by the difference calculation unit 330 as an angle offset Δßoffset. The angle offset Δßoffset corresponds to the error in the detection value of the rotation angle θ due to the displacement of attachment position of the magnetic pole position sensor 4. In the example of FIG. 3, θp−ß=−10° regarding both the maximum peak and the minimum peak so that Δßoffset=−10° is set.

The subtractor 350 subtracts the angle offset Δßoffset stored in the angle offset storage unit 340 from the detection value of the rotation angle θ output from the rotation angle detector 41 when the motor 2 is rotationally driven. Thus, the detection value of the rotation angle θ is corrected so as to suppress the error due to the displacement of the attachment position of the magnetic pole position sensor 4.

A subtraction result of the subtractor 350 is output as the corrected rotation angle θc from the rotation angle correction unit 13 to the three-phase/dq current conversion unit 14 and the dq/three-phase voltage conversion unit 16 in FIG. 2. Thus, the motor 2 is controlled by the motor control device 1 using the corrected rotation angle θc.

Here, advantages of the method of correcting the rotation angle θ in the motor control device 1 of the present embodiment will be described hereinafter in comparison with a conventional method of correcting the rotation angle θ.

As the conventional method of correcting the rotation angle θ, there is known a method of calculating the angle offset Δßoffset by obtaining an angle corresponding to displacement of an attachment position of the magnetic pole position sensor 4 based on a d-axis current value id and a q-axis current value iq obtained by performing dq conversion of the three-phase alternating currents iu, iv, and iw detected by the current sensors 7 during the three-phase short circuit of the motor 2. In this conventional method of calculating the angle offset Δßoffset, however, current detection errors are generated in the d-axis current value id and the q-axis current value iq due to errors included in measurement values of the three-phase alternating currents iu, iv, and iw obtained by the current sensors 7. Therefore, it is difficult to accurately obtain the angle offset Δßoffset.

Hereinafter, the current detection errors in the d-axis current value id and the q-axis current value iq will be described. In the three-phase/dq current conversion unit 14, the d-axis current value id and the q-axis current value iq are calculated by dq conversion expressed by the following Formula (1).

[Formula 1]

$$\begin{bmatrix} id \\ iq \end{bmatrix} = \frac{\sqrt{2}}{3} \begin{bmatrix} \sin(\theta + \frac{\pi}{2}) & \sin(\theta - \frac{\pi}{6}) & -\sin(\theta + \frac{\pi}{6}) \\ -\sin(\theta) & \sin(\theta + \frac{\pi}{3}) & \sin(\theta - \frac{\pi}{3}) \end{bmatrix} \begin{bmatrix} iu \\ iv \\ iw \end{bmatrix} \quad (1)$$

Here, when measurement values of the three-phase alternating currents iu, iv, and iw include errors αu, αv, and αw, respectively, Formula (1) is expressed as the following Formula (2).

[Formula 2]

$$\begin{bmatrix} id \\ iq \end{bmatrix} = \frac{\sqrt{2}}{3} \begin{bmatrix} \sin(\theta + \frac{\pi}{2}) & \sin(\theta - \frac{\pi}{6}) & -\sin(\theta + \frac{\pi}{6}) \\ -\sin(\theta) & \sin(\theta + \frac{\pi}{3}) & \sin(\theta - \frac{\pi}{3}) \end{bmatrix} \begin{bmatrix} iu + \alpha u \\ iv + \alpha v \\ iw + \alpha w \end{bmatrix} \quad (2)$$

When Formula (2) is expanded, the following Formula (3) is obtained.

[Formula 3]

$$\begin{bmatrix} id \\ iq \end{bmatrix} = \frac{\sqrt{2}}{3} \begin{bmatrix} \sin(\theta + \frac{\pi}{2}) & \sin(\theta - \frac{\pi}{6}) & -\sin(\theta + \frac{\pi}{6}) \\ -\sin(\theta) & \sin(\theta + \frac{\pi}{3}) & \sin(\theta - \frac{\pi}{3}) \end{bmatrix} \begin{bmatrix} iu \\ iv \\ iw \end{bmatrix} + \\ \frac{\sqrt{2}}{3} \begin{bmatrix} \sin(\theta + \frac{\pi}{2}) & \sin(\theta - \frac{\pi}{6}) & -\sin(\theta + \frac{\pi}{6}) \\ -\sin(\theta) & \sin(\theta + \frac{\pi}{3}) & \sin(\theta - \frac{\pi}{3}) \end{bmatrix} \begin{bmatrix} \alpha u \\ \alpha v \\ \alpha w \end{bmatrix} \quad (3)$$

The second term on the right side of Formula (3) represents the current detection errors in the d-axis current value id and the q-axis current value iq. In this manner, when the measurement values of the three-phase alternating currents iu, iv, and iw include errors, the current detection errors are generated in the d-axis current value id and the q-axis current value iq, so that it becomes difficult to accurately obtain the angle offset Δßoffset. In particular, the influence of the current detection errors becomes significant in a region where the motor 2 rotates at a high speed or has a high torque. As a result, ride comfort and traveling performance are likely to be impaired, for example, when the motor 2 is the motor for traveling of the vehicle.

On the other hand, in the motor control device 1 of the present embodiment, the detection value of the rotation angle θ at the peak of the current value of the target phase is acquired as the peak-current-time rotation angle θp in the peak-current-time rotation angle acquisition unit 310 of the rotation angle correction unit 13 as described above. Even if measurement values of the three-phase alternating currents iu, iv, and iw include an error, the peak-current-time rotation angle θp is not affected by the error. The reason will be described hereinafter.

For example, as illustrated in FIG. 3, a case is considered in which a current waveform 312 including a vertical displacement caused by an offset error and a shift in amplitude caused by a gain error is measured by the current sensor 7 with respect to an original U-phase current waveform 311. Even in such a case, a peak position of the original current waveform 311 is equal to a peak position of the current waveform 312 including the error. Therefore, the peak-current-time rotation angle θp acquired from the current waveform 312 coincides with the rotation angle θ at a peak in the original current waveform 311 without being affected by a measurement error of the current sensor 7. That is, the peak-current-time rotation angle θp according to the displacement of the attachment position of the magnetic pole position sensor 4 can be accurately acquired by the peak-current-time rotation angle acquisition unit 310 of the rotation angle correction unit 13 regardless of the measurement error of the current sensor 7 in the motor control device 1 of the present embodiment.

As described above, the peak-current-time rotation angle θp according to the displacement of the attachment position of the magnetic pole position sensor 4 can be acquired regardless of the measurement error of the current sensor 7 in the motor control device 1 of the present embodiment. Therefore, the angle offset Δßoffset can be accurately obtained without being affected by the measurement error of the current sensor 7 in comparison with the conventional method of correcting the rotation angle θ.

According to the first embodiment of the present invention described above, the following operational effects are achieved.

(1) The motor control device 1 is driven by the three-phase alternating currents iu, iv, and iw, and controls the motor 2 to which the magnetic pole position sensor 4 measuring a magnetic pole position of a rotor is attached using a detection value of the rotation angle θ of the motor 2 based on a measurement result of the magnetic pole position obtained by the magnetic pole position sensor 4. The motor control device 1 causes the rotation angle correction unit 13 to compare the peak-current-time rotation angle θp representing the detection value of the rotation angle θ at a peak of a current value of a target phase with the reference rotation angle ß representing the rotation angle θ at a peak of a predetermined current waveform of the target phase using any one phase of the three-phase alternating currents iu, iv, and iw during the three-phase short circuit of the motor 2 as the target phase and to correct the detection value of the rotation angle θ based on a result of the comparison. Accordingly, the rotation angle θ of the three-phase AC motor 2 can be accurately obtained.

(2) The rotation angle correction unit 13 of the motor control device 1 includes: the peak-current-time rotation angle acquisition unit 310 that acquires the peak-currenttime rotation angle θp; the reference rotation angle acquisition unit 320 that acquires the reference rotation angle ß; the difference calculation unit. 330 that calculates a difference between the peak-current-time rotation angle θp acquired by the peak-current-time rotation angle acquisition unit 310 and the reference rotation angle acquired by the reference rotation angle acquisition unit 320; and the angle offset storage unit. 340 that stores the difference calculated by the difference calculation unit 330 as the angle offset Δßoffset. The rotation angle correction unit 13 uses the angle offset Δßoffset stored in the angle offset storage unit 340 to correct the detection value of the rotation angle 9 based on the measurement result of the magnetic pole position measured by the magnetic pole position sensor 4 during driving of the motor 2. Accordingly, it is possible to accurately obtain the angle offset Δßoffset and correct the detection value of the rotation angle θ without being affected by a measurement error of the current sensor 7.

(3) As the first method, the peak-current-time rotation angle acquisition unit. 310 can acquire a plurality of maximum current values (for example, iu_max) or minimum current values (for example, iu_min) when the current value of the target phase is measured at a predetermined sampling period, and acquire the detection value of the rotation angle θ at a time point when a median value (for example, iu_max (med) or iu_min (med)) of the plurality of maximum current values or minimum current values is measured can be acquired as the peak-current-time rotation angle θp. In this manner, the peak-current-time rotation angle θp can be easily and accurately acquired.

(4) As the second method, the peak-current-time rotation angle acquisition unit 310 can also acquire the peak-current-time rotation angle θp by acquiring a plurality of combinations of the maximum current value (for example, iu_max) or minimum current value (for example, iu_min) obtained when the current value of the target phase is measured at the predetermined sampling period and the detection value of the rotation angle θ, and estimating the rotation angle θ at a peak of the current value of the target phase using, for example, the least-squares method based on the plurality of combinations. In this manner, the peak-current-time rotation angle θp can be acquired more accurately.

(5) The motor control device 1 controls the motor 2 using the corrected rotation angle θc obtained by correcting the detection value of the rotation angle θ using the rotation angle correction unit 13. Accordingly, it is possible to suppress an influence of a current detection error of the current sensor 7, accurately correct an error of the rotation angle ß caused by displacement of an attachment position of the magnetic pole position sensor 4, and to implement the appropriate control of the motor 2.

Second Embodiment

Next, a second embodiment of the present invention will be described with reference to the drawings. In the present embodiment, an example in which a reference rotation angle is changed based on a temperature of a rotor of the motor 2 will be described.

Figure 4:
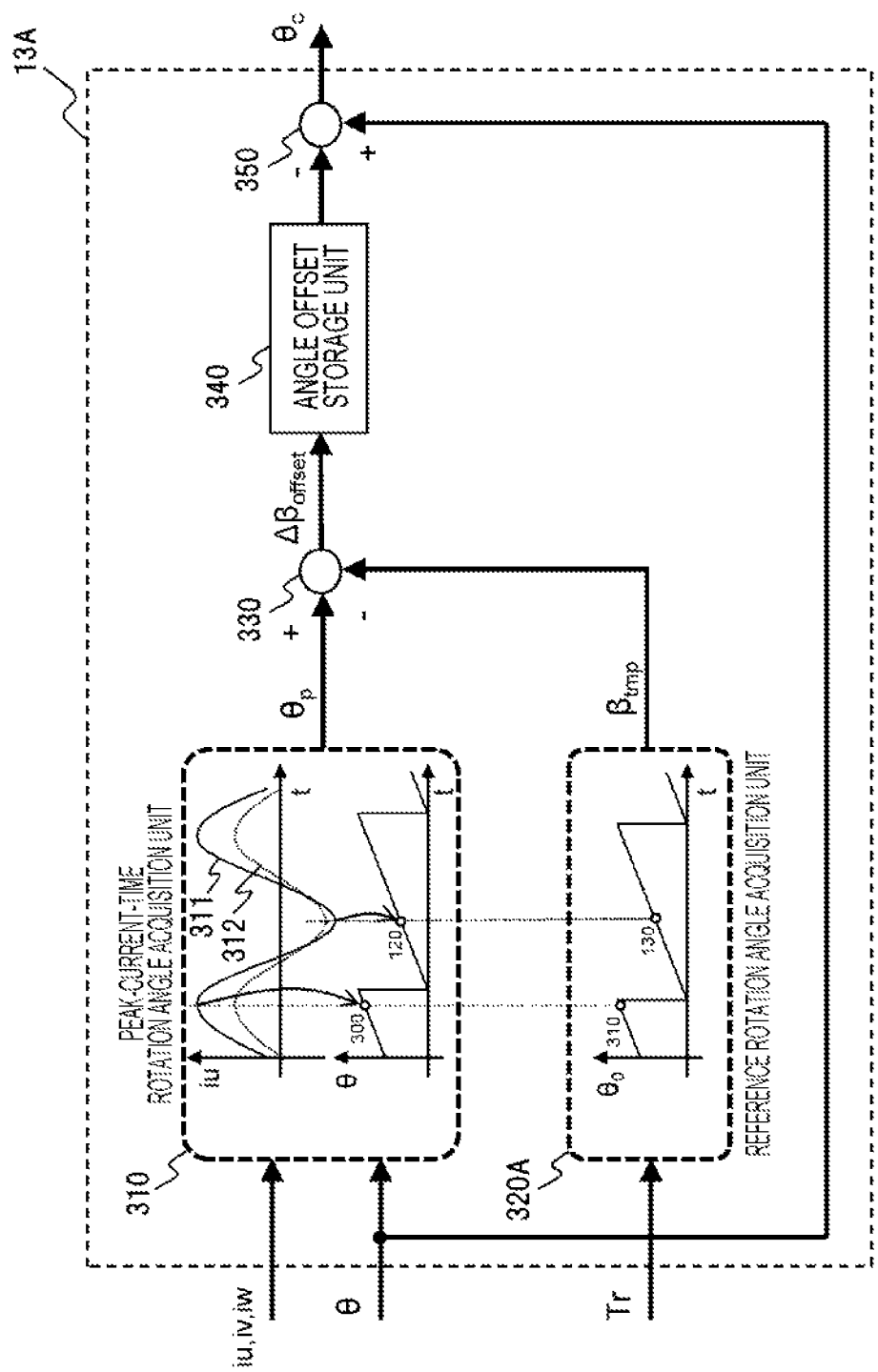
FIG. 4 is a block diagram of a rotation angle correction unit according to a second embodiment of the present invention.

FIG. 4 is a block diagram of a rotation angle correction unit 13A according to the second embodiment of the present invention. The rotation angle correction unit 13A illustrated in FIG. 4 is different from the rotation angle correction unit 13 of FIG. 3 described in the first embodiment in that the reference rotation angle acquisition unit 320 is replaced with a reference rotation angle acquisition unit 320A. Note that a configuration of a motor drive system and a functional configuration of a motor control device in the present embodiment are similar to those in FIGS. 1 and 2 described in the first embodiment. In addition, portions of the rotation angle correction unit 13A other than the reference rotation angle acquisition unit 320A are similar to those of the rotation angle correction unit 13 in FIG. 3. Therefore, the portions other than the reference rotation angle acquisition unit 320A in the motor control device according to the second embodiment of the present invention will not be described hereinafter.

The reference rotation angle acquisition unit 320A acquires a rotor temperature Tr of the motor 2. Note that the rotor temperature Tr can be acquired from, for example, a temperature sensor attached to the rotor of the motor 2. Alternatively, the rotor temperature Tr may be estimated based on a temperature of a portion other than the rotor, for example, a temperature of a refrigerant used for cooling the motor 2, an atmospheric temperature, or the like.

The reference rotation angle acquisition unit 320A sets a value of a reference rotation angle ßtmp according to the rotor temperature Tr based on the acquired value of the rotor temperature Tr, and outputs the value to the difference calculation unit 330. For example, a relationship between the rotor temperature Tr and the reference rotation angle tmp can be expressed by a functional formula based on the laws of physics, and the reference rotation angle ßtmp according to the rotor temperature Tr can be calculated online using this functional formula. Alternatively, map information representing various combinations of the rotor temperature Tr and the reference rotation angle ßtmp may be created in advance by experiment, simulation, or the like, and the value of the reference rotation angle ßtmp according to the rotor temperature Tr may be obtained offline using the map information. Thus, the value of the reference rotation angle ßtmp can be changed based on the rotor temperature Tr.

In the motor 2, a relationship between the three-phase alternating currents iu, iv, and iw and the rotation angle θ varies depending on the rotor temperature Tr. In the present embodiment, this variation is reflected by changing the reference rotation angle ßtmp based on the value of the rotor temperature Tr. This point will be described in detail hereinafter.

When a d-axis voltage and a q-axis voltage in the motor 2 are denoted by Vd and Vq, respectively, a d-axis inductance and a q-axis inductance are denoted by Ld and Lq, respectively, an interlinkage magnetic flux of each coil is denoted by φ, and a winding resistance is denoted by R, voltage equations of the d-axis voltage Vd and the q-axis voltage Vq in a steady state are expressed by the following Formulas (4) and (5), respectively.

$$Vd = -\omega r \cdot Ld \cdot iq + R \cdot id \tag{4}$$

$$Vq = \omega r \cdot \varphi + R \cdot iq + \omega r \cdot Ld \cdot id \tag{5}$$

In addition, the reference rotation angle ß is expressed by the following Formula (6).

$$ß = a\tan(-id/iq) \tag{6}$$

Since Vd=Vq=0 can be satisfied when the motor 2 is in a three-phase short-circuit state, the following Formula (7) is derived by solving Formulas (4) and (5) for id and iq with Vd=Vq=0 and inserting the result into Formula (6).

$$ß = a\tan(-\omega r \cdot Lg/R) \tag{7}$$

It can be seen from Formula (7) that the reference rotation angle ß depends on the motor rotation speed ωr, the q-axis inductance Lq, and the winding resistance R. Here, the q-axis inductance Lq and the winding resistance R vary depending on a temperature of each coil, that is, the rotor temperature Tr. Therefore, if the reference rotation angle ß is kept constant regardless of the rotor temperature Tr as in the first embodiment, a relationship between the three-phase alternating currents iu, iv, and iw and the reference rotation angle ß may collapse depending on a value of the rotor temperature Tr so that it is difficult for the rotation angle correction unit 13 to correctly acquire the angle offset Δßoffset. As a result, the torque accuracy decreases in the control of the motor 2, which is likely to cause a disadvantage such as deterioration of power consumption efficiency or an acceleration failure.

Therefore, the reference rotation angle acquisition unit 320A changes the reference rotation angle ßtmp based on the rotor temperature Tr as described above in the present embodiment. The rotation angle correction unit 13A calculates the angle offset Δßoffset using the reference rotation angle ßtmp instead of the constant reference rotation angle ß. Thus, the angle offset Δßoffset can be accurately acquired even when the rotor temperature Tr varies.

Figure 5:
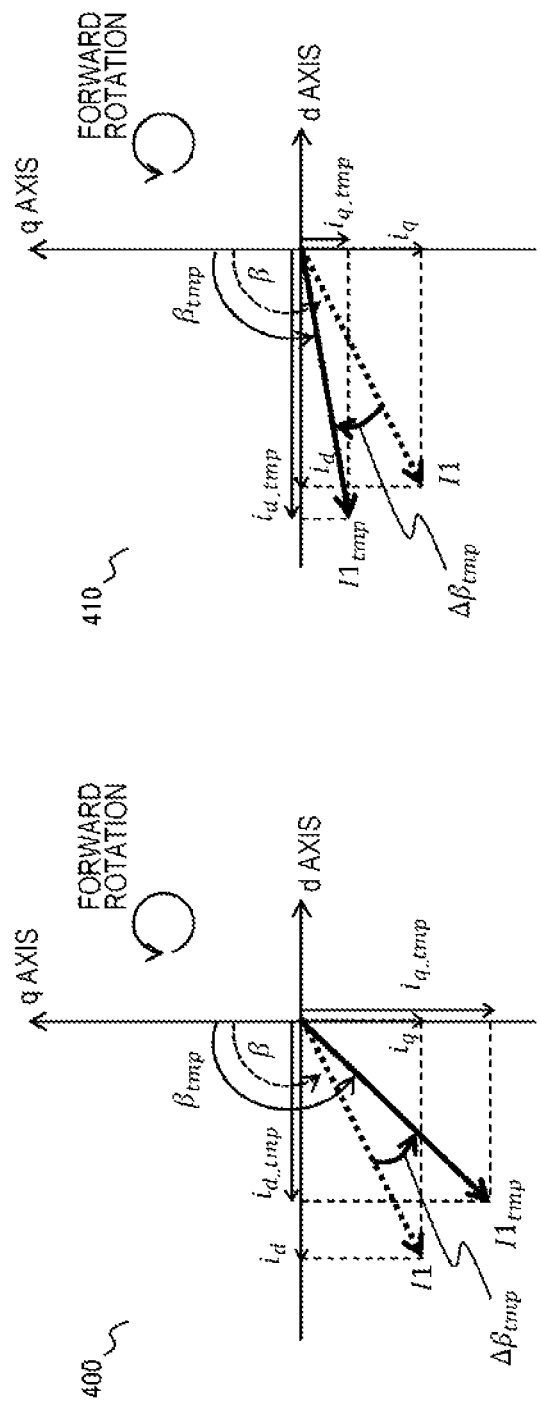
FIG. 5 is a view for describing a specific example of a method of setting a reference rotation angle βtmp.

FIG. 5 is a view illustrating a specific example of a method of setting the reference rotation angle ßtmp in the reference rotation angle acquisition unit 320A according to the second embodiment of the present invention. In FIG. 5, a vector diagram 400 illustrated in (a) represents the reference rotation angle ßtmp at a low temperature, and a vector diagram 410 illustrated in (b) represents the reference rotation angle ßtmp at a high temperature. In these vector diagrams 400 and 410, a current vector corresponding to the preset constant reference rotation angle ß is denoted by I1, a current vector corresponding to the reference rotation angle ßtmp according to the temperature is denoted by I1tmp, and an angle difference between these vectors is denoted by Δßtmp.

Values of the q-axis inductance Lq and the winding resistance R vary depending on the rotor temperature Tr as described above in a state where there is a temperature difference with respect to a reference temperature corresponding to the constant reference rotation angle ß, such as at the low temperature as illustrated in the vector diagram 400 and at the high temperature as illustrated in the vector diagram 410. As a result, the d-axis current id and the q-axis current iq change to id_tmp and iq_tmp in the vector diagrams 400 and 410, respectively. Here, the reference rotation angle ßtmp is calculated by inserting id=id_tmp and iq=iq_tmp in the above-described Formula (6), and is expressed as an angle of the current vector I1tmp obtained by combining the d-axis current vector id_tmp and the q-axis current vector iq_tmp on the vector diagrams 400 and 410. Therefore, the reference rotation angle ßtmp can be correctly calculated using the following Formula (8) by obtaining the above-described angle difference Δßtmp from the rotor temperature Tr.

$$ßtmp = ß + \Delta ßtmp \qquad (8)$$

According to the second embodiment of the present invention described above, the reference rotation angle acquisition unit 320A changes the reference rotation angle ßtmp based on the rotor temperature Tr representing the temperature of the rotor. Accordingly, the angle offset Δßoffset can be accurately acquired even when the motor 2 is at the high temperature or the low temperature.

Third Embodiment

Next, a third embodiment of the present invention will be described with reference to the drawings. In the present embodiment, an example in which a reference rotation angle is changed based on a rotational speed of the motor 2 will be described.

Figure 6:
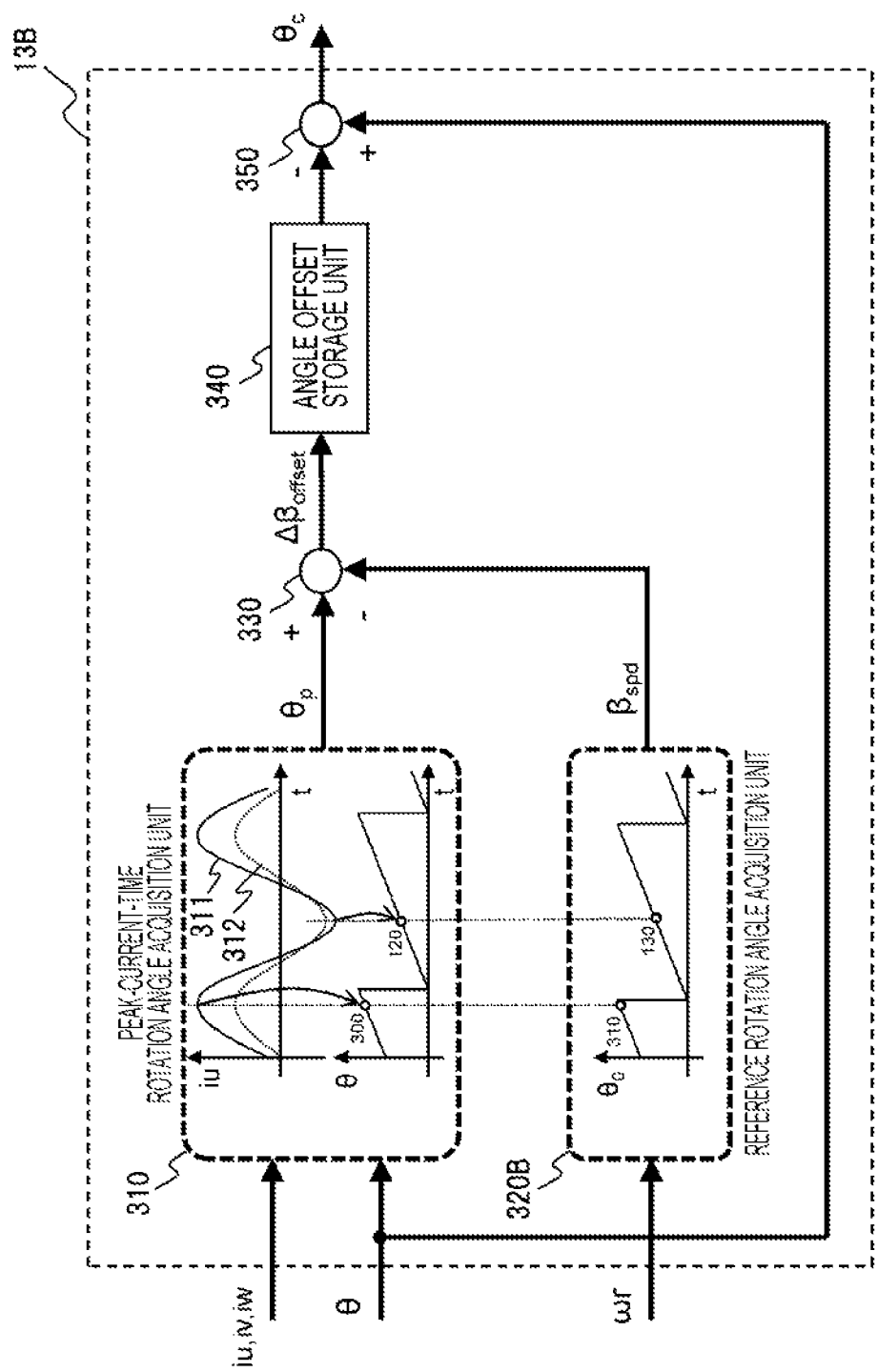
FIG. 6 is a block diagram of a rotation angle correction unit according to a third embodiment of the present invention.

FIG. 6 is a block diagram of a rotation angle correction unit 13B according to the third embodiment of the present invention. The rotation angle correction unit 13B illustrated in FIG. 6 is different from the rotation angle correction unit 13 of FIG. 3 described in the first embodiment in that the reference rotation angle acquisition unit 320 is replaced with a reference rotation angle acquisition unit 320B. Note that a configuration of a motor drive system and a functional configuration of a motor control device in the present embodiment are similar to those in FIGS. 1 and 2 described in the first embodiment. In addition, portions of the rotation angle correction unit 13B other than the reference rotation angle acquisition unit 320B are similar to those of the rotation angle correction unit 13 in FIG. 3. Therefore, the portions other than the reference rotation angle acquisition unit 320B in the motor control device according to the third embodiment of the present invention will not be described hereinafter.

The reference rotation angle acquisition unit 320B acquires the motor rotation speed ωr representing a rotational speed of the motor 2 from the speed calculation unit 12. Then, a value of a reference rotation angle ßspd according to the motor rotation speed ωr is set based on the acquired value of the motor rotation speed ωr and output to the difference calculation unit 330. For example, a relationship between the motor rotation speed ωr and the reference rotation angle spd can be expressed by a functional formula based on the laws of physics, and the reference rotation angle ßspd according to the motor rotation speed ωr can be calculated online using this functional formula. Alternatively, map information representing various combinations of the motor rotation speed ωr and the reference rotation angle ßspd may be created in advance by experiment, simulation, or the like, and the value of the reference rotation angle ßspd according to the motor rotation speed ωr may be obtained offline using the map information. Thus, the reference rotation angle ßspd can be changed based on the rotational speed of the motor 2.

In the motor 2, a relationship between the three-phase alternating currents iu, iv, and iw and the rotation angle θ varies depending on the motor rotation speed ωr. In the present embodiment, this variation is reflected by changing the reference rotation angle ßspd based on the value of the motor rotation speed ωr. This point will be described in detail hereinafter.

As described in the second embodiment, it can be seen from the above-described Formula (7) that the reference rotation angle ß depends on the motor rotation speed ωr, the q-axis inductance Lq, and the winding resistance R. Here, an influence of a variation in the motor rotation speed ωr can be ignored in Formula (7) at the time of high rotation of the motor 2, but it is difficult to ignore the influence at the time of low rotation. Therefore, if the reference rotation angle ß is kept constant regardless of the motor rotation speed ωr as in the first embodiment, a relationship between the three-phase alternating currents iu, iv, and iw and the reference rotation angle ß may collapse depending on a value of the motor rotation speed ωr so that it is difficult for the rotation angle correction unit 13 to correctly acquire the angle offset Δßoffset. As a result, the torque accuracy decreases in the control of the motor 2, which is likely to cause a disadvantage such as deterioration of power consumption efficiency or an acceleration failure.

Therefore, the reference rotation angle acquisition unit 320B changes the reference rotation angle ßspd based on the motor rotation speed ωr as described above in the present embodiment. The rotation angle correction unit 13B calculates the angle offset Δßoffset using the reference rotation angle ßspd instead of the constant reference rotation angle ß. Thus, the angle offset Δßoffset can be accurately acquired even when the motor 2 rotates at a low speed.

Figure 7:
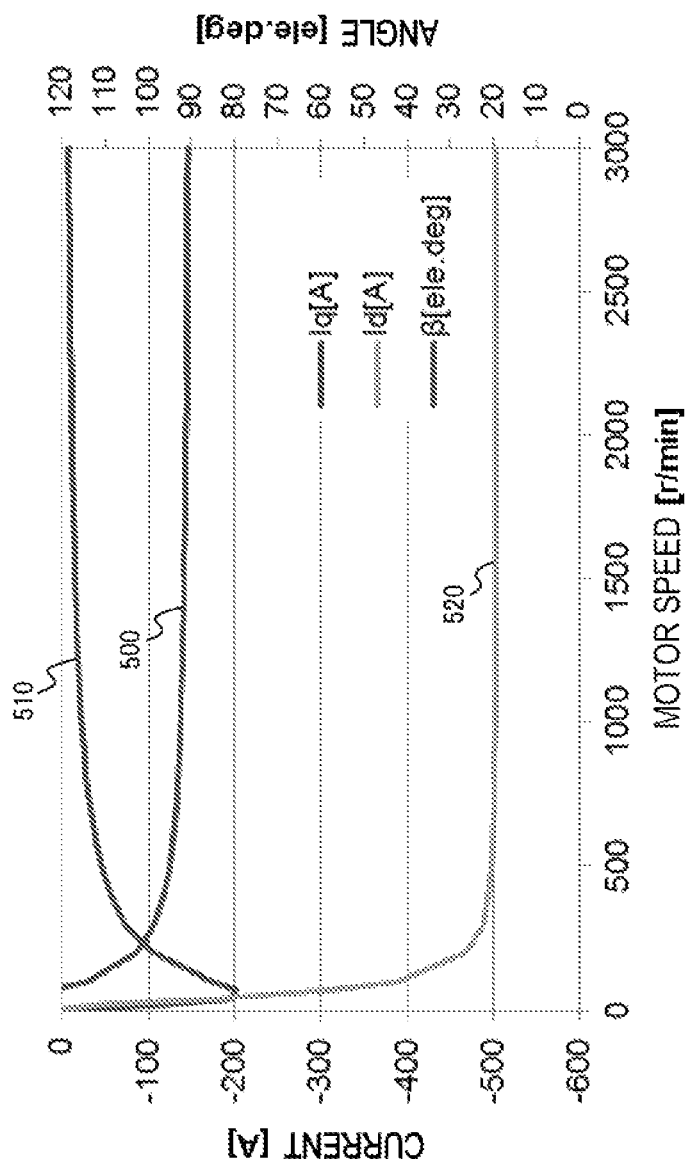
FIG. 7)

FIG. 7 is a view illustrating a specific example of a method of setting the reference rotation angle ßspd in the reference rotation angle acquisition unit 320B according to the third embodiment of the present invention. In FIG. 7, relationships among the motor rotation speed ωr, the d-axis current id and the q-axis current iq, and the reference rotation angle ßspd during a three-phase short circuit of the motor 2 are represented by curves 500, 510, and 520.

As illustrated in FIG. 7, in a region where the motor rotational speed is relatively high, for example, in a region where a value of the motor rotation speed ωr is 2000 [r/min] or more, the d-axis current id and the q-axis current iq hardly change even when the motor rotation speed ωr changes, and thus, the reference rotation angle ßspd is substantially constant. On the other hand, in a region where the motor rotational speed is low, the d-axis current id and the q-axis current iq change depending on a change in the motor rotation speed ωr, and the reference rotation angle ßspd also changes accordingly. Therefore, when a difference Δßspd between the preset constant reference rotation angle ß and the reference rotation angle spd in the low-rotation region is obtained from the motor rotation speed ωr, the reference rotation angle ßspd can be correctly calculated using the following Formula (9).

$$\text{ßspd} = \text{ß} + \Delta\text{ßspd} \tag{9}$$

According to the third embodiment of the present invention described above, the reference rotation angle acquisition unit 320B changes the reference rotation angle ßspd based on the motor rotation speed ωr representing a rotational speed of a rotor. Accordingly, the angle offset Δßoffset can be accurately acquired even when the motor 2 rotates at a low speed.

Note that the above-described embodiments and various modifications are merely examples, and the present invention is not limited to these contents unless the features of the invention are impaired. In addition, each of the embodiments and each of the various modifications may be employed alone or in any combination. For example, when the second and third embodiments are combined, the reference rotation angle ß that changes depending on the motor rotation speed ωr, the q-axis inductance Lq, and the winding resistance R can be acquired as an appropriate value to accurately obtain the angle offset Δßoffset regardless of the state of the motor 2 during the three-phase short circuit. Further, the various embodiments and modifications have been described as above, but the present invention is not limited to these contents. Other aspects that can be considered within the scope of the technical ideas of the present invention are also included in the scope of the present invention.

REFERENCE SIGNS LIST 1 motor control device
2 motor
3 inverter
4 magnetic pole position sensor
5 high-voltage battery
7 current sensor
11 current command generation unit
12 speed calculation unit
13, 13A, 13B rotation angle correction unit
14 three-phase/dq current conversion unit
15 current control unit
16 dq/three-phase voltage conversion unit
17 gate signal generation unit
31 inverter circuit
32 PWM signal drive circuit
33 smoothing capacitor
41 rotation angle detector
100 motor drive system
310 peak-current-time rotation angle acquisition unit
320, 320A, 320B reference rotation angle acquisition unit
330 difference calculation unit
340 angle offset storage unit
350 subtractor

The invention claimed is:

1. A motor control device that controls a motor, the motor control device comprising:
a plurality of hardware circuits communicatively coupled to a magnetic pole position sensor that measures a magnetic pole position of a rotor of the motor, wherein the motor is driven by three-phase alternating currents,
wherein the plurality of hardware circuits are collectively configured to:
determine a detection value of a rotation angle of the motor based on a measurement result of the magnetic pole position by the magnetic pole position sensor,
perform a comparison of a peak-current-time rotation angle representing the detection value of the rotation angle at a peak of a current value of a target phase and a reference rotation angle representing the rotation angle at a peak of a predetermined current waveform of the target phase using any one phase of the three-phase alternating currents during a three-phase short circuit of the motor as a target phase, and
correct the detection value of the rotation angle based on a result of the comparison.

2. The motor control device according to claim 1, wherein the plurality of hardware circuits are further collectively configured to:
determine the peak-current-time rotation angle,
calculate the reference rotation angle, and
calculate a difference between the peak-current-time rotation angle and the reference rotation angle,
store the difference as an angle offset, and
correct the detection value of the rotation angle based on the measurement result of the magnetic pole position measured during driving of the motor using the angle offset stored.

3. The motor control device according to claim 2, wherein the plurality of hardware circuits are further collectively configured to:
calculate a plurality of maximum current values or minimum current values when the current value of the target phase is measured at a predetermined sampling period, and
calculate as the peak-current-time rotation angle, a detection value of the rotation angle at a time point when a median value of the plurality of maximum current values or minimum current values is measured.

4. The motor control device according to claim 2, wherein the plurality of hardware circuits are further collectively configured to:

calculate the peak-current-time rotation angle by acquiring a plurality of combinations of the detection value of the rotation angle and a maximum current value or a minimum current value obtained when the current value of the target phase is measured at a predetermined sampling period, and estimating the rotation angle at the peak of the current value of the target phase based on the plurality of combinations.

5. The motor control device according to claim 2, wherein the plurality of hardware circuits are further collectively configured to:
change the reference rotation angle based on a temperature of the rotor.

6. The motor control device according to claim 2, wherein the plurality of hardware circuits are further collectively configured to:
change the reference rotation angle based on a rotational speed of the rotor.

7. The motor control device according to claim 1, where the plurality of hardware circuits are formed from one or more Field Programmable Gate Arrays (FPGAs).

8. The motor control device according to claim 1, where the plurality of hardware circuits are formed from one or more integrated circuits (ICs).

9. A motor control method for controlling a motor, the motor control method comprising:
determining a detection value of a rotation angle of the motor based on a measurement result of a magnetic pole position by a magnetic pole position sensor that measures the magnetic pole position of a rotor of the motor, wherein the motor is driven by three-phase alternating currents performing a comparison of a peak-current-time rotation angle representing the detection value of the rotation angle at a peak of a current value of a target phase and a reference rotation angle representing the rotation angle at a peak of a predetermined current waveform using any one phase of the three-phase alternating currents during a three-phase short circuit of the motor as the target phase;

correcting the detection value of the rotation angle based on a result of the comparison between the peak-current-time rotation angle and the reference rotation angle; and controlling the motor using a corrected detection value of the rotation angle.

* * * * *